US011990308B2

(12) United States Patent
Hayashi et al.

(10) Patent No.: US 11,990,308 B2
(45) Date of Patent: May 21, 2024

(54) FIELD EMISSION DEVICE, FIELD EMISSION METHOD AND POSITIONING AND FIXING METHOD

(71) Applicant: MEIDENSHA CORPORATION, Tokyo (JP)

(72) Inventors: Takumi Hayashi, Numazu (JP); Rena Takahashi, Numazu (JP); Hayato Ochi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/008,016

(22) PCT Filed: May 26, 2021

(86) PCT No.: PCT/JP2021/019937

§ 371 (c)(1),
(2) Date: Dec. 2, 2022

(87) PCT Pub. No.: WO2021/246254

PCT Pub. Date: Dec. 9, 2021

(65) Prior Publication Data

US 2023/0197395 A1 Jun. 22, 2023

(30) Foreign Application Priority Data

Jun. 5, 2020 (JP) ................................ 2020-098126

(51) Int. Cl.
*H01J 35/06* (2006.01)
*H01J 1/304* (2006.01)
*H01J 19/24* (2006.01)

(52) U.S. Cl.
CPC ............ *H01J 35/065* (2013.01); *H01J 1/304* (2013.01); *H01J 19/24* (2013.01); *H01J 35/064* (2019.05);

(Continued)

(58) Field of Classification Search
CPC .... H01J 35/065; H01J 2235/064; H01J 1/304; H01J 19/24
See application file for complete search history.

(56) References Cited

U.S. PATENT DOCUMENTS 10,068,741 B2 9/2018 Takahashi et al.
10,424,457 B2 9/2019 Takahashi et al.

(Continued)

FOREIGN PATENT DOCUMENTS

JP 2004-235121 A 8/2004
JP 4408891 B2 2/2010

(Continued)

*Primary Examiner* — Chih-Cheng Kao
(74) *Attorney, Agent, or Firm* — Foley & Lardner LLP

(57) ABSTRACT

Opening edge surface (45*a*) of an emitter supporting unit female screw bore (45) provided at an emitter supporting unit (4) extends along radial direction of the emitter supporting unit female screw bore (45). An emitter supporting unit operation hole (32) provided at a flange portion (30*a*) of a vacuum enclosure (11) has shape into which one selected from a position adjustment shaft (6) and a pressing shaft (9) can be inserted from their shaft tip sides. The position adjustment shaft is provided, on an outer circumferential surface of its tip (61), with a tip side male screw portion (61*a*) that can be screwed into the emitter supporting unit female screw bore (45). The pressing shaft has, at its tip (91), a tip surface (91*a*) having a larger diameter than an opening diameter of the emitter supporting unit female screw bore (45) and extending along radial direction of the pressing shaft.

11 Claims, 8 Drawing Sheets

(52) U.S. Cl.
CPC ... *H01J 2235/062* (2013.01); *H01J 2235/064* (2013.01)

(56) References Cited

U.S. PATENT DOCUMENTS

| | | | |
|---|---|---|---|
| 10,607,801 | B2 | 3/2020 | Takahashi et al. |
| 10,643,816 | B1 | 5/2020 | Choi et al. |
| 10,651,001 | B2 | 5/2020 | Takahashi et al. |
| 2010/0002840 | A1 | 1/2010 | Jaafar et al. |
| 2013/0234582 | A1 | 9/2013 | Ishiguro et al. |
| 2017/0365439 | A1 | 12/2017 | Takahashi et al. |
| 2019/0333730 | A1 | 10/2019 | Takahashi et al. |

FOREIGN PATENT DOCUMENTS

| | | | | | |
|---|---|---|---|---|---|
| JP | 6135827 | B2 | | 5/2017 | |
| JP | 6226033 | B1 | | 11/2017 | |
| JP | 2017-224399 | A | | 12/2017 | |
| JP | 2017-228444 | A | | 12/2017 | |
| JP | 2017-228471 | A | | 12/2017 | |
| KR | 1020160058582 | A | | 5/2016 | |
| WO | WO-2016/104484 | A1 | | 6/2016 | |
| WO | WO-2017221479 | A1 | * | 12/2017 | ............ H01J 1/3044 |

* cited by examiner

FIELD EMISSION DEVICE, FIELD EMISSION METHOD AND POSITIONING AND FIXING METHOD

CROSS-REFERENCE TO RELATED APPLICATIONS

The present application is a U.S. national stage entry of International Application No. PCT/JP2021/019937 filed May 26, 2021, which claims priority to Japanese Application No. 2020-098126 filed Jun. 5, 2020, the entire contents of each of which are incorporated herein by reference.

TECHNICAL FIELD

The present invention relates to a field emission device (an electric field radiation device), a field emission method (an electric field radiation method) and a positioning and fixing method which can be applied to various devices such as an X-ray apparatus, an electron tube and a lighting system.

BACKGROUND ART

As an example of the electric field radiation device applied to various devices such as the X-ray apparatus, the electron tube and the lighting system, there has been known a configuration using a vacuum enclosure formed by sealing both ends of a tubular insulator and having a vacuum chamber at an inner circumferential side of the insulator.

At one side in both end directions of the insulator (hereinafter, simply referred to as both end directions, as necessary) of the vacuum chamber, an emitter (an electron source formed of carbon etc.) is arranged, and at the other side in the both end directions, a target is arranged. Then, by applying voltage between these emitter and target, an electron beam is emitted by field emission (by generation of electrons and emission of the electrons) of the emitter, and by colliding the emitted electron beam with the target, a desired function (for instance, in the case of the X-ray apparatus, a radioscopy resolution by external emission of X-ray) is obtained.

In the field emission device (the electric field radiation device) like the above, suppression of dispersion of the electron beam emitted from the emitter, for instance, by employing a triode structure formed with a grid electrode interposed between the emitter and the target, and/or by shaping a surface of an electron generating portion (a portion that is located at a side facing the target and generates electrons) of the emitter into a curved surface, and/or by arranging a guard electrode, which is at the same potential as the emitter, at an outer circumferential side of the emitter, has been discussed.

It is desirable that the electron beam be emitted by generating the electrons from only the electron generating portion of the emitter by the above application of voltage. However, if an undesired minute protrusion or dirt etc. exists in the vacuum chamber, an unintended flashover phenomenon easily occurs, and a withstand voltage performance cannot be obtained, then a desired function may not be able to be obtained.

Such phenomenon occurs, for instance, in a case where a portion at which a local electric field concentration easily occurs (e.g. a minute protrusion formed during working process) is formed at the guard electrode etc. (the target, the grid electrode and the guard electrode, hereinafter, simply called the guard electrode etc., as necessary) in the vacuum chamber, in a case where the guard electrode etc. adsorb gas component (e.g. a residual gas component in the vacuum enclosure) and in a case where an element causing the electron to be easily generated is contained in materials applied to the guard electrode etc. In these cases, the electron generating portion is formed also at the guard electrode etc., and a quantity of generation of the electron becomes unstable, then the electron beam easily disperses. For instance, in the case of the X-ray apparatus, there is a risk that X-ray will be out of focus.

Therefore, as a method of suppressing the flashover phenomenon (as a method of stabilizing the quantity of generation of the electron), for instance, a method of performing a voltage discharge conditioning process (regeneration (reforming); hereinafter, simply referred to as a regeneration process, as necessary) that applies voltage (high voltage) across the guard electrode etc. (e.g. between the guard electrode and the grid electrode) and repeats discharge, has been studied.

For instance, Patent Document 1 discloses an electric field radiation device having a movable emitter supporting unit (a reference sign 4 in FIG. 1 of Patent Document 1) supporting the emitter movably in both end directions of the vacuum chamber, an emitter supporting unit operation hole (a reference sign 62c in FIG. 1 of Patent Document 1) formed at one side of the vacuum enclosure by penetrating the one side of the vacuum enclosure and a position adjustment shaft (a reference sign 61 in FIG. 1 of Patent Document 1) screwed and connected to an emitter supporting unit female screw bore (a reference sign 40a in FIG. 1 of Patent Document 1) of the emitter supporting unit through the emitter supporting unit operation hole and moving the emitter supporting unit in the both end directions.

Further, the Patent Document 1 discloses that after assembling each component (e.g. the vacuum enclosure, the emitter supporting unit, the guard electrode, etc.) of the electric field radiation device, by turning, in a tightening direction, the position adjustment shaft screwed and connected to the emitter supporting unit, the emitter supporting unit is operated, then the emitter moves from a dischargeable region (a reference sign m in FIG. 1 of Patent Document 1) to a no-discharge region (a reference sign n in FIG. 1 of Patent Document 1). With this, a state in which the field emission of the emitter is suppressed is set, and in this state, by applying voltage across the guard electrode etc., the regeneration process can be performed.

Further, the Patent Document 1 discloses that after performing the regeneration process, by turning, in a loosening direction, the position adjustment shaft screwed and connected to the emitter supporting unit, the emitter supporting unit is operated, then the emitter moves from the no-discharge region to the dischargeable region. With this, a distance between the electron generating portion of the emitter and the guard electrode is narrower, and both are positioned close to each other or contact each other, then the field emission of the emitter (the electron generating portion) can be possible.

CITATION LIST

Patent Document

Patent Document 1: Japanese Patent No. 6226033

SUMMARY OF THE INVENTION

In the electric field radiation device, various tolerances (hereinafter, simply referred to as a tolerance, as necessary)

such as a tolerance on dimension of each component and an assembling tolerance of each component could exist. If such tolerance exists, for instance, after performing the regeneration process, even if the emitter is made to move from the no-discharge region to the dischargeable region by simply operating the emitter supporting unit by the position adjustment shaft as described above, a case where both of the electron generating portion of the emitter and the guard electrode cannot be sufficiently close to each other or cannot contact each other (for instance, an unintended gap is formed between them) may occur. In this case, it is also conceivable that desired field emission is not performed at the emitter (the electron generating portion).

The present invention was made in view of the above technical problem. An object of the present invention is therefore to provide a technique that is capable of easily bringing both of the electron generating portion of the emitter and the guard electrode closer to each other as desired or easily bringing both of the electron generating portion of the emitter and the guard electrode into contact with each other as desired, then easily obtaining desired field emission.

The electric field radiation device (the field emission device), the electric field radiation method (the field emission method) and the positioning and fixing method according to the present invention are those that can solve the above problem. As one aspect of the electric field radiation device, an electric field radiation device comprises: a vacuum enclosure having a vacuum chamber at an inner circumferential side of a tubular insulator whose both ends are sealed; an emitter positioned at one side in both end directions in the vacuum chamber and having an electron generating portion that faces the other side in the both end directions of the vacuum chamber; a guard electrode arranged at an outer circumferential side of the electron generating portion of the emitter; a target positioned at the other side in the both end directions in the vacuum chamber and provided so as to face the electron generating portion of the emitter; a movable emitter supporting unit supporting the emitter movably in both end directions of the vacuum chamber; an emitter supporting unit female screw bore opening on the one side in the both end directions at the emitter supporting unit and having a screw bore that extends in the both end directions; bellows having a tubular shape having a larger diameter than the emitter supporting unit female screw bore and expanding and contracting in the both end directions, wherein the bellows are arranged so that an axis of the tubular bellows extends coaxially with the screw bore of the emitter supporting unit female screw bore, one end side of the tubular bellows is retained by one side in the both end directions of the vacuum enclosure and the other end side of the tubular bellows is retained by an outer circumferential side of the emitter supporting unit, and form a part of the vacuum chamber; and an emitter supporting unit operation hole penetrating an inner circumferential side of the bellows in the both end directions at the one side in the both end directions of the vacuum enclosure and extending in the both end directions so that an axis of the emitter supporting unit operation hole is arranged coaxially with the screw bore of the emitter supporting unit female screw bore.

Further, an opening edge surface of the emitter supporting unit female screw bore extends along a radial direction of the emitter supporting unit female screw bore, the emitter supporting unit operation hole has a shape into which one selected from a position adjustment shaft and a pressing shaft can be inserted from shaft tip sides of the position adjustment shaft and the pressing shaft, the position adjustment shaft can be turned with the position adjustment shaft inserted in the emitter supporting unit operation hole, and is provided, on an outer circumferential surface of a tip of the position adjustment shaft, with a tip side male screw portion that can be screwed into the emitter supporting unit female screw bore, and the pressing shaft has, at a tip thereof, a tip surface having a larger diameter than an opening diameter of the emitter supporting unit female screw bore and extending along a radial direction of the pressing shaft.

The pressing shaft is provided, at a middle of the tip surface of the tip thereof, with a recess which is open to the other side in the both end directions and whose diameter is larger than the opening diameter of the emitter supporting unit female screw bore.

The emitter supporting unit operation hole is provided, on an inner circumferential surface at a middle in the both end directions thereof, with an inner circumferential step portion whose diameter is reduced stepwise from the one side toward the other side in the both end directions, the pressing shaft is provided, on an outer circumferential surface at a middle in the both end directions thereof, with an outer circumferential step portion whose diameter is reduced stepwise from the one side toward the other side in the both end directions, and both of the inner circumferential step portion and the outer circumferential step portion overlap each other in the both end directions, and come into contact with each other when the electron generating portion of the emitter and the guard electrode are brought closer to each other or into contact with each other.

The inner circumferential step portion and the outer circumferential step portion each have a contact surface having a tapered shape whose diameter is reduced in a radial direction of the emitter supporting unit operation hole from the one side toward the other side in the both end directions.

The emitter supporting unit operation hole is provided, at one side in the both end directions thereof, with an operation hole female screw portion having a screw bore that extends in the both end directions, and the pressing shaft is provided, on an outer circumferential surface of a base end portion thereof, with a base end portion side male screw portion that can be screwed into the operation hole female screw portion.

The emitter supporting unit operation hole has a base end portion passage that extends from the one side toward a middle side in the both end directions and expands in two opposing directions of a radial direction of the emitter supporting unit operation hole; and a hollow portion that bulges outwards in the radial direction of the emitter supporting unit operation hole at the other side in the both end directions of the base end portion passage, the pressing shaft has, at a base end portion thereof, a protruding portion that extends in two opposing directions of the radial direction of the pressing shaft, the base end portion passage is shaped so that a diameter thereof is larger than a diameter at the other side in the both end directions of the emitter supporting unit operation hole, and when the pressing shaft inserted in the emitter supporting unit operation hole is in a fixed attitude at an arbitrary angle in a turning direction, the base end portion of the pressing shaft is movable in the both end directions, and the hollow portion is shaped so that the base end portion, which is positioned at the other side in the both end directions of the base end portion passage, of the pressing shaft can be turned.

The pressing shaft and the base end portion passage are structured so that when the base end portion of the pressing shaft is positioned at the other side in the both end directions of the base end portion passage, the electron generating portion of the emitter and the guard electrode are brought closer to each other or into contact with each other.

The guard electrode is provided, at the other side in the both end directions thereof, with a small diameter portion which and from which the electron generating portion of the emitter contacts and separates by movement in the both end directions of the emitter supporting unit.

The guard electrode is provided, at the other side in the both end directions thereof, with an edge portion that extends to a screw bore side of the emitter supporting unit female screw bore and overlaps a circumferential edge portion of the electron generating portion of the emitter in the both end directions.

As one aspect of the field emission method, a field emission method using the electric field radiation device comprises: setting an output of a field emission current by inserting a shaft selected from the position adjustment shaft and the pressing shaft into the emitter supporting unit operation hole from its shaft tip side and by changing a distance between the electron generating portion of the emitter and the target through the shaft and fixing and setting a position of the emitter at an arbitrary distance; and performing field emission from the electron generating portion of the emitter with the position of the emitter fixed.

As one aspect of the positioning and fixing method, a positioning and fixing method of the emitter of the electric field radiation device comprises: inserting the position adjustment shaft into the emitter supporting unit operation hole from its shaft tip side; bringing the electron generating portion of the emitter and the target into a separate state by screwing the position adjustment shaft into the emitter supporting unit female screw bore and turning the position adjustment shaft in a tightening direction; performing are generation process to at least the guard electrode in the vacuum chamber by applying voltage across the guard electrode in the separate state; after the regeneration process, removing the position adjustment shaft from the emitter supporting unit operation hole by turning the position adjustment shaft in a loosening direction, and inserting the pressing shaft into the emitter supporting unit operation hole from its shaft tip side; and bringing the electron generating portion of the emitter and the target closer to each other or into contact with each other, and positioning and fixing the emitter.

According to the present invention described above, it is possible to easily bring both of the electron generating portion of the emitter and the guard electrode closer to each other as desired or easily bring both of the electron generating portion of the emitter and the guard electrode into contact with each other as desired, then easily obtain desired field emission.

EMBODIMENTS FOR CARRYING OUT THE INVENTION

Figure 1:
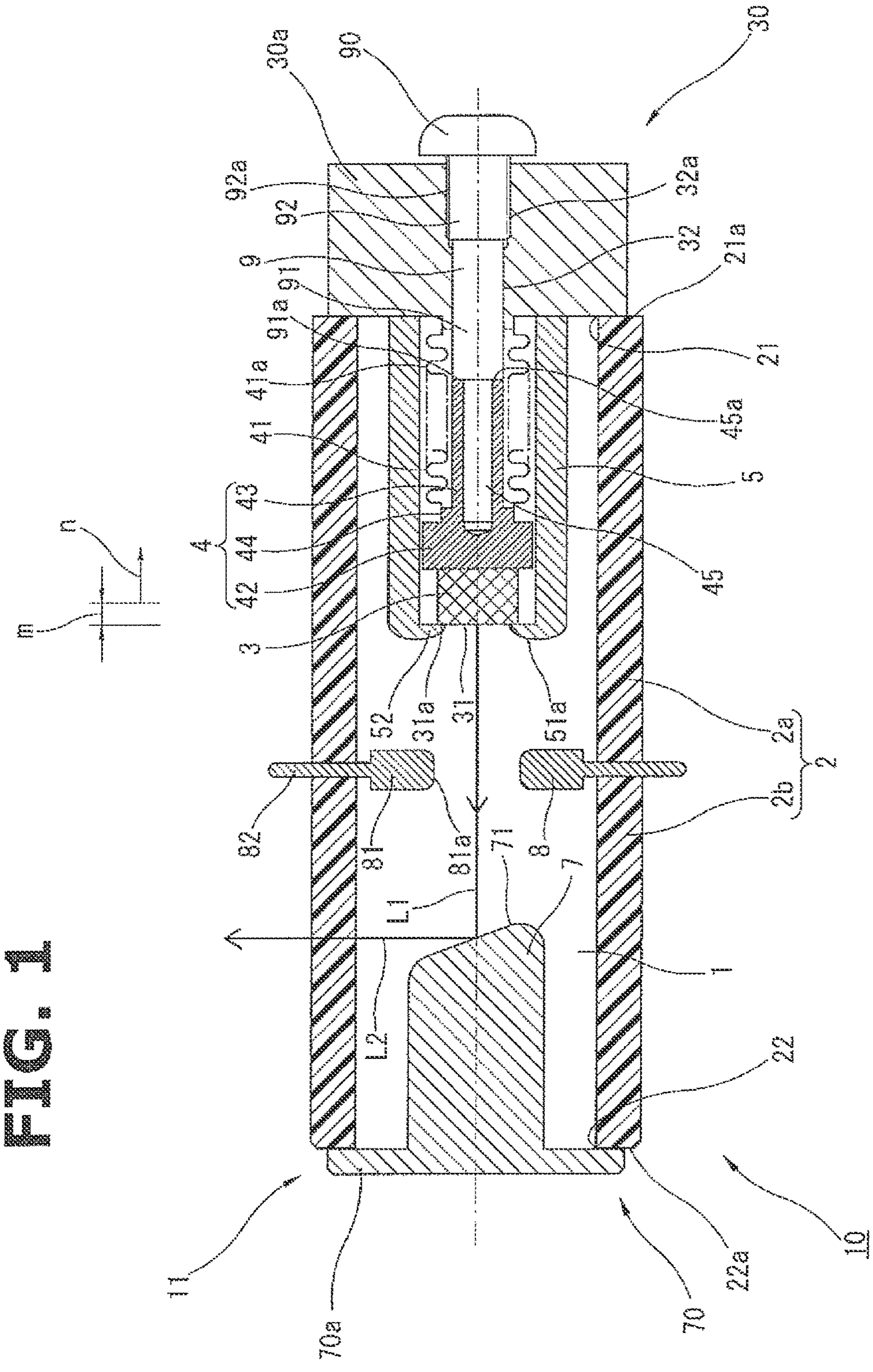
FIG. 1 is a schematic diagram illustrating an X-ray apparatus 10 according to an embodiment 1 (a sectional view vertically cut in both end directions of a vacuum chamber 1 (in a case where a pressing shaft 9 is applied)).

A field emission device (an electric field radiation device), a field emission method (an electric field radiation method) and a positioning and fixing method according to embodiments of the present invention are completely different from a configuration (hereinafter, simply referred to as a conventional configuration, as necessary) in which the emitter moves between the no-discharge region and the dischargeable region by simply operating the emitter supporting unit by the position adjustment shaft, for instance, as disclosed in Patent Document 1.

That is, in the present embodiments, an opening edge surface of an emitter supporting unit female screw bore, which is open at one side in both end directions of an emitter supporting unit, extends along in a radial direction of the emitter supporting unit female screw bore.

Further, an emitter supporting unit operation hole provided at one side (at a flange portion 30*a* in after-mentioned FIGS. 1 and 2) in both end directions of a vacuum enclosure has a shape which or into which one selected from a position adjustment shaft (a position adjustment shaft 6 in FIG. 2) and a pressing shaft (a pressing shaft 9 in FIG. 1) can penetrate or be inserted from their shaft tip sides.

In addition, the position adjustment shaft is provided, on an outer circumferential surface of a tip thereof, with a tip side male screw portion which can be screwed into the emitter supporting unit female screw bore. Further, a tip surface (a tip surface facing the emitter supporting unit female screw bore in a penetrating or inserting state) of a tip of the pressing shaft has a larger diameter than an opening diameter of the emitter supporting unit female screw bore, and extends along a radial direction of the pressing shaft.

According to the present embodiments having these configurations (or structures), when turning the position adjustment shaft in a tightening direction (in a direction in which the position adjustment shaft goes into the emitter supporting unit female screw bore) in a state in which the tip of the position adjustment shaft is screwed into the emitter supporting unit female screw bore through the emitter supporting unit operation hole, it is possible to move the emitter from the dischargeable region to the no-discharge region.

In this state in which the emitter has moved to the no-discharge region, by applying voltage across a guard electrode etc., the regeneration process can be performed. Further, after performing the regeneration process, when turning the position adjustment shaft in a loosening direction (in a direction in which the position adjustment shaft is retracted from the emitter supporting unit female screw bore), it is possible to move the emitter from the no-discharge region to the dischargeable region.

Here, for instance, if a tolerance exists in the electric field radiation device, even if the position adjustment shaft is simply turned like the conventional configuration, a case where both of an electron generating portion of the emitter and the guard electrode cannot be close to each other as desired or cannot contact each other as desired (for instance, an unintended gap is formed between them) may occur.

In this case, in the present embodiments, first the position adjustment shaft is removed from the emitter supporting unit operation hole, and the pressing shaft is inserted into the emitter supporting unit operation hole and pressed toward the other side in the both end directions (while being guided by and in the emitter supporting unit operation hole), then the pressing shaft is brought to a state in which the tip surface of the tip of the pressing shaft is in surface contact with the opening edge surface of the emitter supporting unit female screw bore (hereinafter, this state is simply called a surface-contact state, as necessary).

Subsequently, by further pressing the pressing shaft in the surface-contact state, it is possible to move the emitter supporting unit to the other side in the both end directions while suppressing axial misalignment (parallel eccentricity, deflection angle, etc.) of the pressing shaft with respect to the emitter supporting unit.

Therefore, according to the present embodiments, even if the tolerance exists in the electric field radiation device, by moving the emitter supporting unit by appropriately using the pressing shaft, it is possible to easily bring both of the electron generating portion of the emitter and the guard electrode closer to each other as desired or easily bring both of the electron generating portion of the emitter and the guard electrode into contact with each other as desired (hereinafter, these are simply called a predetermined adjacent state, as necessary). Desired field emission (in the case of the X-ray apparatus, X-irradiation etc.) can therefore be easily obtained.

The present embodiments can be variously modified by properly applying common general technical knowledge of each technical field (e.g. the field of electric field radiation device, the field of carbon nanotube, etc.) and referring to Patent Document 1 as necessary, as long as the present embodiments have the aforementioned configuration or structure in which the emitter supporting unit operation hole has the shape in which one selected from the position adjustment shaft and the pressing shaft can be turned (or rotate) with the selected one shaft penetrating or inserted into the emitter supporting unit operation hole from their shaft tip sides and the emitter supporting unit can be moved by appropriately selecting and using the position adjustment shaft and the pressing shaft. As examples of this configuration, the following embodiments 1 to 4 are raised.

Here, in the following embodiments 1 to 4, the same element or component is denoted by the same reference sign, and its explanation will be omitted. Further, for the sake of convenience, both end directions of the after-mentioned vacuum enclosure 11 are simply referred to as both end directions, one side in the both end directions is simply referred to as a both-end one side, and the other side in the both end directions is simply referred to as a both-end other side.

Embodiment 1

<Schematic Configuration of X-Ray Apparatus 10>

Figure 2:
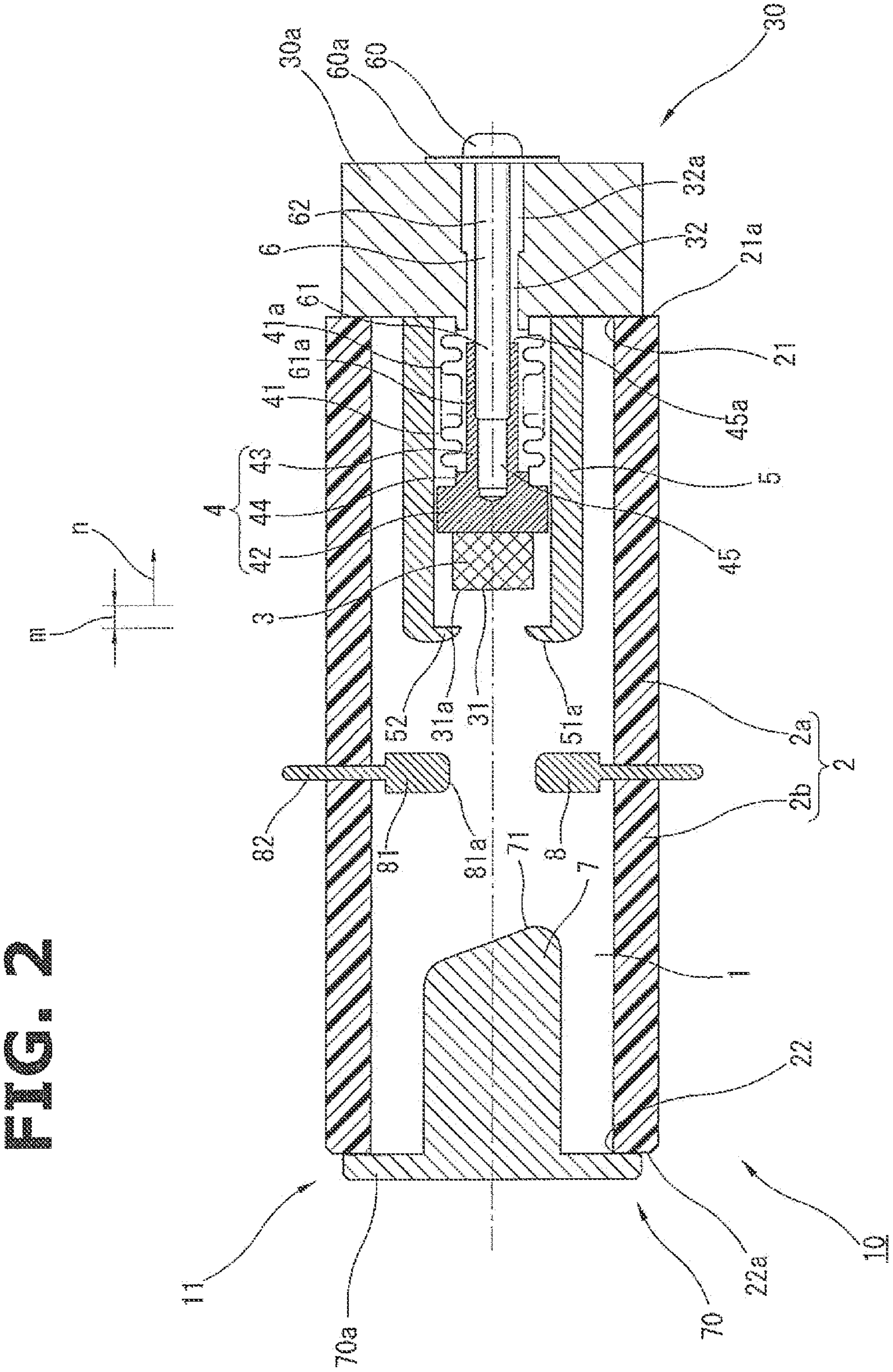
FIG. 2 is a schematic diagram illustrating the X-ray apparatus 10 according to the embodiment 1 (a sectional view vertically cut in both end directions of the vacuum chamber 1 (in a case where a position adjustment shaft 6 is applied)).

A reference sign 10 in schematic diagrams illustrated in FIGS. 1 and 2 is an X-ray apparatus according to an embodiment 1. In the X-ray apparatus 10, an opening 21 at a both-end one side of a tubular insulator 2 and an opening 22 at a both-end other side are sealed with an emitter unit 30 and a target unit 70 respectively (e.g. by brazing), and a vacuum enclosure 11 having a vacuum chamber 1 at an inner circumferential side of the insulator 2 is defined.

Between the emitter unit 30 and the target unit 70 (between an after-mentioned emitter 3 and an after-mentioned target 7), a grid electrode 8 that extends in a crossing direction of the vacuum chamber 1 (a direction crossing the both end directions of the vacuum enclosure 11, hereinafter, simply referred to as a crossing direction (or a cross-section direction), as necessary) is provided.

The insulator 2 is formed of insulation material such as ceramic. As the insulator 2, various shapes or forms can be employed as long as they can isolate the emitter unit 30 (the emitter 3) and the target unit 70 (the target 7) from each other and form the vacuum chamber 1 inside them. For instance, as shown in the drawings, it is a configuration in which the grid electrode 8 (e.g. an after-mentioned lead terminal 82) is interposed between two tubular insulation members **2*a* and 2*b* arranged coaxially in an axial direction and the both these insulation members 2*a* and 2*b*** are fixed together by brazing etc.

The emitter unit 30 has a flange portion **30*a* supported by and on an end surface 21*a* of the opening 21 of the insulator 2 and sealing the opening 21, the emitter 3 having, at a portion facing the target unit 70 (the target 7), an electron generating portion 31, a movable emitter supporting unit 4 supporting the emitter 3 movably in the both end directions and a guard electrode 5 arranged at an outer circumferential side of the electron generating portion 31 of the emitter 3**.

The emitter supporting unit 4 is supported by the flange portion **30*a* through bellows 41 that can expand and contract in the both end directions, and can move in the both end directions by appropriately selecting and using after-mentioned position adjustment shaft 6 and pressing shaft 9 (by using the selected one shaft with the selected one shaft penetrating or inserted into after-mentioned emitter supporting unit operation hole 32**).

As the emitter 3, various shapes or forms can be employed as long as they have the electron generating portion 31 as described above and electrons are generated from the electron generating portion 31 by application of voltage and also as shown in the drawings they can emit an electron beam L1 (as a radiator or an emitter). For instance, it is made of material of carbon etc. (carbon nanotube etc.), and as shown in the drawings, a solid emitter or a thin-film emitter formed by evaporation is used as the emitter 3. As the electron generating portion 31, it is preferable to shape a surface, facing the target unit 70 (the target 7), of the electron generating portion 31 into a concave shape (a curved shape) in order for the electron beam L1 to easily converge.

As the emitter supporting unit 4, various shapes or forms can be employed as long as they can support the emitter 3 movably in the both end directions as described above and move by operation of the position adjustment shaft 6 or the pressing shaft 9.

In a case of the emitter supporting unit 4 in the drawings, the emitter supporting unit 4 has a tip portion 42 supporting a both-end one side of the emitter 3 (e.g. fixing and supporting a portion of the emitter 3 which is located at an opposite side to the electron generating portion 31 by caulking, swaging or welding etc.) at an inner circumferential side of the guard electrode 5 and a columnar portion 43 located at a both-end one side of the tip portion 42, extending in the both end directions and having a smaller diameter than the tip portion 42.

Further, a step portion 44 is formed on an outer circumferential surface between the tip portion 42 and the columnar portion 43.

The columnar portion 43 is provided with an emitter supporting unit female screw bore 45 opening in the both-end one side direction and having a screw bore extending in the both end directions. An opening edge surface 45*a* of this emitter supporting unit female screw bore 45 has a shape extending along a radial direction of the emitter supporting unit female screw bore 45.

The emitter supporting unit 4 can be formed of various material, and material is not particularly limited. For instance, the emitter supporting unit 4 could be formed of conductive metal material such as stainless (SUS material etc.) and copper.

The bellows 41 have a tubular shape having a larger diameter than the columnar portion 43 (a larger diameter than the emitter supporting unit female screw bore 45), and are arranged so that an axis of the bellows 41 extends coaxially with the screw bore of the emitter supporting unit female screw bore 45. An end portion at a both-end one side of the bellows 41 is retained by the flange portion 30*a*, and an end portion at a both-end other side of the bellows 41 is retained by an outer circumferential side (the step portion 44 in the drawings) of the emitter supporting unit 4.

Such bellows 41 define the vacuum chamber 1 and the atmospheric side (the outer peripheral side of the vacuum enclosure 11), and can maintain air tightness of the vacuum chamber 1 (the bellows 41 form a part of the vacuum enclosure 11). Further, the emitter supporting unit 4 is supported through the bellows 41, and when operating the emitter supporting unit 4 by appropriately selecting and using the position adjustment shaft 6 and the pressing shaft 9, the emitter supporting unit 4 moves in the both end directions with the bellows 41 expanding and contracting, then the emitter 3 also moves in the both end directions.

As the bellows 41, various shapes or forms can be employed as long as they can expand and contract in the both end directions. For instance, the bellows could be molded by working process of metal material such as metal sheet or metal plate. As an example, as shown in the drawings, the bellows 41 have a bellow tubular wall 41*a* that extends in the both end directions so as to surround or cover an outer circumferential side of the columnar portion 43.

As the guard electrode 5, as long as the guard electrode 5 is arranged at the outer circumferential side of the electron generating portion 31 of the emitter 3 as described above and the electron generating portion 31 of the emitter 3 moved by and according to the movement of the emitter supporting unit 4 contacts and separates from the guard electrode 5 then when the guard electrode 5 and the emitter 3 are in the predetermined adjacent state (e.g. as shown in FIG. 1), the guard electrode 5 can suppress dispersion of the electron beam L1 emitted from the emitter 3, various shapes or forms can be employed.

As an example of the guard electrode 5, the guard electrode 5 is made of material of stainless (SUS material etc.), and has a tubular shape that extends in the both end directions at an outer circumferential side of the emitter 3. Further, an end portion at a both-end one side of the guard electrode 5 is retained by an outer circumferential side, with respect to the bellows 41, of the flange portion 30*a*, and an end portion at a both-end other side (i.e. the target 7 side) of the guard electrode 5 contacts and separates from the emitter 3.

Figure 3:
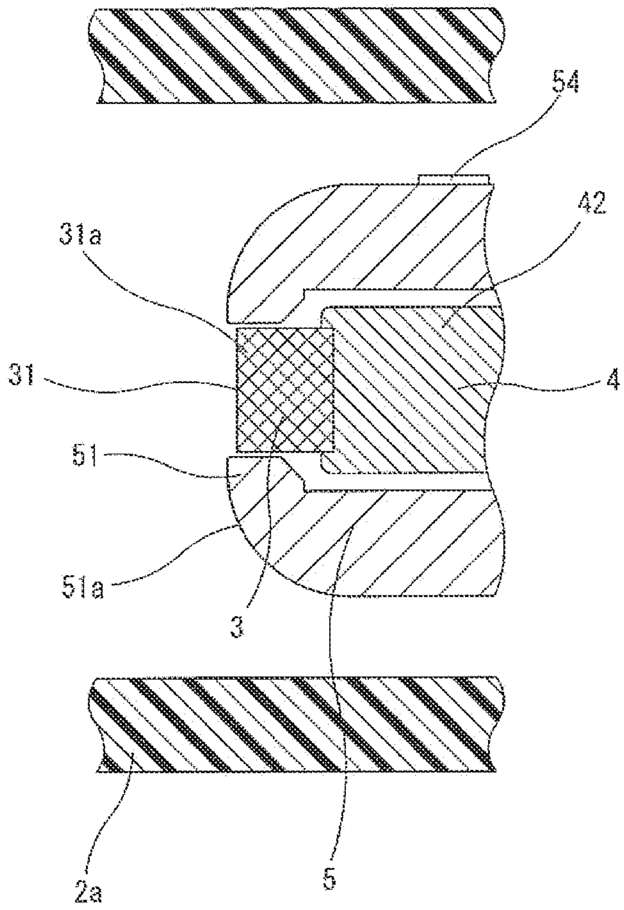
FIG. 3 is a schematic diagram illustrating an example of a guard electrode 5 (an enlarged view of a part of FIG. 1, where the guard electrode 5 has a small diameter portion 51 instead of an edge portion 52).

This configuration of the guard electrode 5 to contact and separate from the emitter 3 is not particularly limited. For instance, as shown in FIG. 3, a configuration in which a small diameter portion 51 is formed at the end portion on the both-end other side of the guard electrode 5 is conceivable. However, the configuration as shown in FIGS. 1 and 2, in which an edge portion 52 that extends to the screw bore side of the emitter supporting unit female screw bore 45 and overlaps a circumferential edge portion 31*a* of the electron generating portion 31 of the emitter 3 in the both end directions is formed, is raised. Further, both of the small diameter portion 51 and the edge portion 52 could be formed (not shown).

In such contacting and separating configuration of the guard electrode 5, by the movement of the emitter supporting unit 4, the emitter 3 moves in the both end directions at the inner circumferential side (a tubular inner circumferential side) of the guard electrode 5, and the electron generating portion 31 of the emitter 3 contacts and separates from the small diameter portion 51 or the edge portion 52. Further, in the configuration in which the guard electrode 5 has the edge portion 52, when the guard electrode 5 and the emitter 3 are in the predetermined adjacent state, the circumferential edge portion 31*a* of the electron generating portion 31 is covered with and protected by the edge portion 52.

Further, it is possible to employ a shape that can suppress a local electric field concentration which could occur at the electron generating portion 31 (especially, at the circumferential edge portion 31*a*) and/or suppress the flashover occurring from the electron generating portion 31 to other portions, by enlarging an apparent radius of curvature of the circumferential edge portion 31*a* of the electron generating portion 31 of the emitter 3. For instance, as shown in the drawings, the guard electrode 5 has a shape having a curved surface portion 51*a* at the end portion on the both-end other side of the guard electrode 5.

Here, in the case of the guard electrode 5 shown in FIG. 3, although a getter 54 is fixed to an outer circumferential side of the guard electrode 5 by welding, a fixing position and material of the getter 54 are not particularly limited.

The flange portion 30*a* is provided with the emitter supporting unit operation hole 32 that penetrates the flange portion 30*a* in the both end directions at a position on an inner circumferential side of the bellows 41 (also penetrates the inner circumferential side of the bellows 41) and extends in the both end directions so that an axis of the emitter supporting unit operation hole 32 is arranged coaxially with the screw bore of the emitter supporting unit female screw bore 45. This emitter supporting unit operation hole 32 has a shape which or into which one selected from the position adjustment shaft 6 and the pressing shaft 9 can penetrate or be inserted from their shaft tip sides (in the case of the position adjustment shaft 6, from a tip 61 of the position adjustment shaft 6).

In a case of the emitter supporting unit operation hole 32 shown in the drawings, the emitter supporting unit operation hole 32 is provided, at a both-end one side thereof, with an operation hole female screw portion 32*a* having a screw bore that extends in the both end directions, then an after-mentioned base end portion side male screw portion 92*a* can be screwed into the operation hole female screw portion 32*a*.

The position adjustment shaft 6 is provided, on an outer circumferential surface of the tip 61 thereof, with a tip side male screw portion 61*a* which can be screwed into the emitter supporting unit female screw bore 45 in a state in which the position adjustment shaft 6 is inserted in the emitter supporting unit operation hole 32 (i.e. in a state shown in FIG. 2).

In a case of the position adjustment shaft 6 shown in the drawings, the position adjustment shaft 6 is provided, at a both-end one side of a base end portion 62 thereof, with a screw head 60, then the position adjustment shaft 6 (the screw head 60) can be secured (or tightened) to an opening edge surface of the emitter supporting unit operation hole 32 through a washer (spacer) 60*a*.

As illustrated in FIG. 2, in a state in which the tip 61 of the position adjustment shaft 6 inserted in the emitter supporting unit operation hole 32 is screwed into the emitter supporting unit female screw bore 45, by operating the position adjustment shaft 6 through the screw head 60 which an operator grips, the position adjustment shaft 6 can be turned in tightening and loosening directions.

For instance, when turning the position adjustment shaft 6 in the tightening direction, the emitter supporting unit 4 moves to the both-end one side. On the other hand, when turning the position adjustment shaft 6 in the loosening direction, the emitter supporting unit 4 moves to the both-end other side (to the target 7 side). Further, by bringing the turn of the position adjustment shaft 6 to a fixed state, a position of the emitter supporting unit 4 is fixed, i.e. a position of the emitter 3 is fixed.

With respect to the pressing shaft 9, a tip surface (a tip surface facing the emitter supporting unit female screw bore 45 in the penetrating or inserting state shown in FIG. 1) 91*a* of a tip 91 of the pressing shaft 9 has a larger diameter than an opening diameter of the emitter supporting unit female screw bore 45, and extends along a radial direction of the pressing shaft 9. With this, as illustrated in FIG. 1, in a state in which the pressing shaft 9 is inserted in the emitter supporting unit operation hole 32, both of the tip surface 91*a* of the pressing shaft 9 and the opening edge surface 45*a* of the emitter supporting unit female screw bore 45 extend parallel to each other (in the crossing direction) and can be in surface contact with each other.

The pressing shaft 9 is provided, on an outer circumferential surface of a base end portion 92 thereof, with the base end portion side male screw portion 92*a* which can be screwed into the operation hole female screw portion 32*a*.

In a case of the pressing shaft 9 shown in the drawings, the pressing shaft 9 is provided, at a both-end one side of the base end portion 92 thereof, with a screw head 90 having a larger diameter than the emitter supporting unit operation hole 32, then the pressing shaft 9 (the screw head 90) can be secured (or tightened) to the opening edge surface of the emitter supporting unit operation hole 32 through e.g. a washer (not shown) as necessary.

As illustrated in FIG. 1, in a state in which the tip surface 91*a* of the pressing shaft 9 inserted in the emitter supporting unit operation hole 32 and the opening edge surface 45*a* of the emitter supporting unit female screw bore 45 are in surface contact with each other, by operating the pressing shaft 9 through the screw head 90 which the operator grips (in a case where the base end portion side male screw portion 92*a* has been screwed into the operation hole female screw portion 32*a*, by turning the pressing shaft 9) and moving the pressing shaft 9 to a both-end other side, the emitter supporting unit 4 also moves to the both-end other side (to the target 7 side). Further, by bringing the movement in the both end directions of the pressing shaft 9 to a fixed state (e.g. a state as shown in FIG. 1), a position of the emitter supporting unit 4 is fixed, i.e. a position of the emitter 3 is fixed.

Here, in a case of the configuration in which the base end portion side male screw portion 92*a* is screwed into the operation hole female screw portion 32*a* like the pressing shaft 9 shown in FIG. 1, since it is possible to move the pressing shaft 9 in the both end directions while turning the pressing shaft 9, fine adjustment of its movement amount in the both end directions can be easily made.

Next, the target unit 70 has the target 7 facing the electron generating portion 31 of the emitter 3 and a flange portion 70*a* supported by an end surface 22*a* of the opening 22 of the insulator 2 and sealing the opening 22.

As the target 7, various shapes or forms can be employed as long as the electron beam L1 emitted from the electron generating portion 31 of the emitter 3 collides and as shown in the drawings an X-ray L2 can be emitted. In the drawings, the target 7 has, at a portion facing the electron generating portion 31 of the emitter 3, an inclined surface 71 that extends in an intersecting direction that inclines at a predetermined angle with respect to the electron beam L1. By the fact that the electron beam L1 collides with this inclined surface 71, the X-ray L2 is emitted in a direction (e.g. in the crossing direction of the vacuum chamber 1 as shown in the drawings) that is bent from an irradiation direction of the electron beam L1.

As the grid electrode 8, various shapes or forms can be employed as long as they are interposed between the emitter 3 and the target 7 as described above and they can properly control the electron beam L1 that passes thorough them. For instance, as shown in the drawings, the grid electrode 8 has an electrode portion (e.g. a mesh electrode portion) 81 extending in the crossing direction of the vacuum chamber 1 and having a passing hole 81*a* thorough which the electron beam L1 passes and the lead terminal 82 penetrating the insulator 2 (in the crossing direction of the vacuum chamber 1).

According to the X-ray apparatus configured as described above, by appropriately selecting and using the position adjustment shaft 6 and the pressing shaft 9, it is possible to move the emitter supporting unit 4, thereby changing a distance between the electron generating portion 31 of the emitter 3 and the target 7. For instance, as illustrated in FIG. 2, in a state in which the electron generating portion 31 is moved from the dischargeable region m to the no-discharge region n and the field emission of the emitter 3 is suppressed, a desired regeneration process for the guard electrode 5, the target 7, the grid electrode 8 etc. can be performed.

<An Example of Regeneration Process for Guard Electrode Etc. And Field Emission Method of X-Ray Apparatus 10>

When performing the regeneration process for the guard electrode 5 etc. of the X-ray apparatus 10, first, when turning the position adjustment shaft 6 in the tightening direction in the state in which the tip 61 of the position adjustment shaft

6 inserted in the emitter supporting unit operation hole 32 is screwed into the emitter supporting unit female screw bore 45, as illustrated in FIG. 2, the emitter supporting unit 4 moves to the both-end one side, and the emitter 3 moves to the no-discharge region n, then the state in which the field emission of the electron generating portion 31 is suppressed is set. In this state, both of the electron generating portion 31 of the emitter 3 and the edge portion 52 (in the case of FIG. 3, the small diameter portion 51) of the guard electrode 5 are separate from each other (the emitter 3 is moved to the no-discharge region so as to be a discharge electric field or less).

By properly applying a predetermined regeneration voltage between the guard electrode 5 and the grid electrode 8 (the lead terminal 82) and/or between the target 7 and the grid electrode 8 in this state as shown in FIG. 2, discharge is repeated at the guard electrode 5 etc., then the guard electrode 5 etc. undergo the regeneration process (the surface of the guard electrode 5 melts or dissolves and is smoothed out).

As the field emission method after the above regeneration process, by turning the position adjustment shaft 6 in the loosening direction, the emitter supporting unit 4 moves to the both-end other side (to the target 7 side), and the emitter 3 moves to the dischargeable region m, then the state in which the field emission of the electron generating portion 31 is possible is set. In this state, both of the electron generating portion 31 of the emitter 3 and the guard electrode 5 are in the predetermined adjacent state as desired, then the dispersion of the electron beam L1 emitted from the emitter 3 is suppressed.

Here, in a case where both of the electron generating portion 31 of the emitter 3 and the guard electrode 5 cannot be brought into the predetermined adjacent state as desired (for instance, in a case where an unintended gap is formed between them) e.g. by reason of existence of the tolerance in the X-ray apparatus 10, first the position adjustment shaft 6 is removed from the emitter supporting unit operation hole 32.

Next, the pressing shaft 9 is inserted into the emitter supporting unit operation hole 32 from its tip 91 side and pressed toward the both-end other side, then the tip surface 91*a* of the pressing shaft 9 and the opening edge surface 45*a* of the emitter supporting unit female screw bore 45 are brought into the surface-contact state.

Subsequently, by further pressing the pressing shaft 9 in this surface-contact state, it is possible to move the emitter supporting unit 4 to the other side in the both end directions while suppressing axial misalignment (parallel eccentricity, deflection angle, etc.) of the pressing shaft 9 with respect to the emitter supporting unit 4.

With this, both of the electron generating portion 31 of the emitter 3 and the guard electrode 5 can be brought into the predetermined adjacent state as shown in FIG. 1, then the dispersion of the electron beam L1 emitted from the emitter 3 is suppressed.

By applying a predetermined voltage between the emitter 3 and the target 7 with the electron generating portion 31 of the emitter 3 and the guard electrode 5 being at the same potential in this state shown in FIG. 1, electrons are generated from the electron generating portion 31 of the emitter 3 and the electron beam L1 is emitted, and the electron beam L1 collides with the target 7, then the X-ray L2 is emitted from the target 7.

According to the embodiment described above, by the regeneration process by the appropriate operation of the position adjustment shaft 6 inserted in the emitter supporting unit operation hole 32, it is possible to suppress the flashover phenomenon (generation of the electrons) from the guard electrode 5 etc. in the X-ray apparatus 10, thereby stabilizing the quantity of generation of the electron of the X-ray apparatus 10. Further, the electron beam L1 can become a converging electron beam, and this easily brings the X-ray L2 to a focus, then high radioscopy resolution can be obtained.

Further, according to the field emission method (the electric field radiation method) described in the embodiment 1, by appropriately selecting one of the position adjustment shaft 6 and the pressing shaft 9 and using the selected one shaft with the selected one shaft penetrating or inserted into the emitter supporting unit operation hole 32, even if the tolerance exists in the X-ray apparatus 10, it is possible to easily bring both of the electron generating portion 31 of the emitter 3 and the guard electrode 5 into the predetermined adjacent state as desired.

That is, the distance between the electron generating portion 31 of the emitter 3 and the target 7 is changed, and the position of the emitter 3 is fixed and set at an arbitrary distance, then desired X-irradiation etc. can be obtained in this position-fixing state.

Embodiment 2

In the X-ray apparatus 10, as shown in FIG. 2, there is a case where, when turning the position adjustment shaft 6 in the tightening and loosening directions in the state in which the tip 61 of the position adjustment shaft 6 is screwed into the emitter supporting unit female screw bore 45, foreign matter such as so-called burr is generated in the emitter supporting unit female screw bore 45.

In a case where such foreign matter exists, after removing the position adjustment shaft 6, when merely inserting the pressing shaft 9 into the emitter supporting unit operation hole 32 and bringing both of the tip surface 91*a* of the pressing shaft 9 and the opening edge surface 45*a* of the emitter supporting unit female screw bore 45 closer to each other as shown in FIG. 1, the foreign matter may be interposed between them.

Because of this, the both of the tip surface 91*a* and the opening edge surface 45*a* cannot be brought into the surface-contact state, and if the pressing shaft 9 is made to move to the both-end other side as it is, there is a risk that axial misalignment between the pressing shaft 9 and the emitter supporting unit 4 will occur.

Therefore, in an embodiment 2, assuming that the above foreign matter exists, the following pressing shaft 9A is applied.

<Schematic Configuration of Pressing Shaft 9A>

Figure 4:
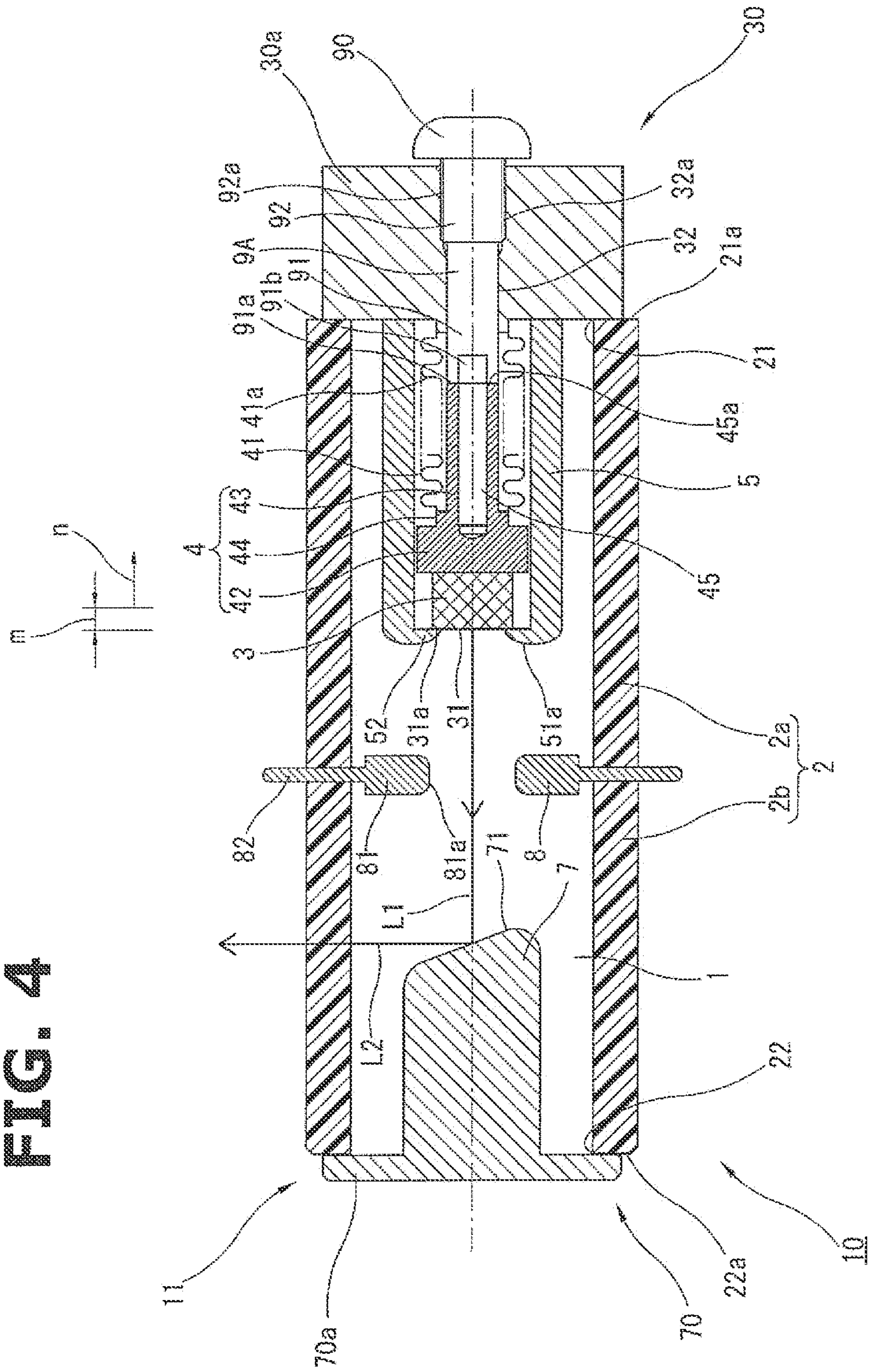
FIG. 4 is a schematic diagram illustrating an X-ray apparatus 10 according to an embodiment 2 (a sectional view vertically cut in both end directions of a vacuum chamber 1 (in a case where a pressing shaft 9A is applied)).

FIG. 4 is a schematic diagram illustrating the X-ray apparatus 10 to which a pressing shaft 9A according to the embodiment 2 is applied. This pressing shaft 9A is provided with a recess (so-called counterbore) 91*b* at the middle (an axial center) of the tip surface 91*a* thereof. This recess 91*b* has a shape which is open to the both-end other side at the middle of the tip surface 91*a* and whose diameter is larger than the opening diameter of the emitter supporting unit female screw bore 45.

According to the embodiment 2 described above, the same working and effect as those of the embodiment 1 can be obtained, and also the following can be said. That is, for instance, in a case where the foreign matter exists in the emitter supporting unit female screw bore 45, when bringing both of the tip surface 91*a* of the pressing shaft 9A and the opening edge surface 45*a* of the emitter supporting unit female screw bore 45 closer to each other and into contact with each other as shown in FIG. 4, the foreign matter is easily received in the recess 91*b*.

It is therefore possible to prevent the foreign matter from being interposed between the tip surface 91*a* and the opening edge surface 45*a*. Then, both of the tip surface 91*a* and the opening edge surface 45*a* can be easily brought into the surface-contact state, thereby easily suppressing the axial misalignment of the pressing shaft 9A with respect to the emitter supporting unit 4.

Embodiment 3

In the X-ray apparatus 10, by properly setting the movement amount in the both end directions of the pressing shaft 9 and 9A, it is possible to bring both of the electron generating portion 31 of the emitter 3 and the guard electrode 5 into the predetermined adjacent state as desired. However, since an inside of the X-ray apparatus 10 cannot be visually checked, it may be difficult to check whether both of the electron generating portion 31 of the emitter 3 and the guard electrode 5 are actually in the predetermined adjacent state. That is, it may be difficult to properly set the movement amount in the both end directions of the pressing shaft 9 and 9A.

Therefore, in an embodiment 3, as described below, an X-ray apparatus 10B to which a pressing shaft 9B can be applied is configured, then the movement amount in the both end directions of the pressing shaft 9B is easily and properly set.

<Schematic Configuration of X-Ray Apparatus 10B>

Figure 5:
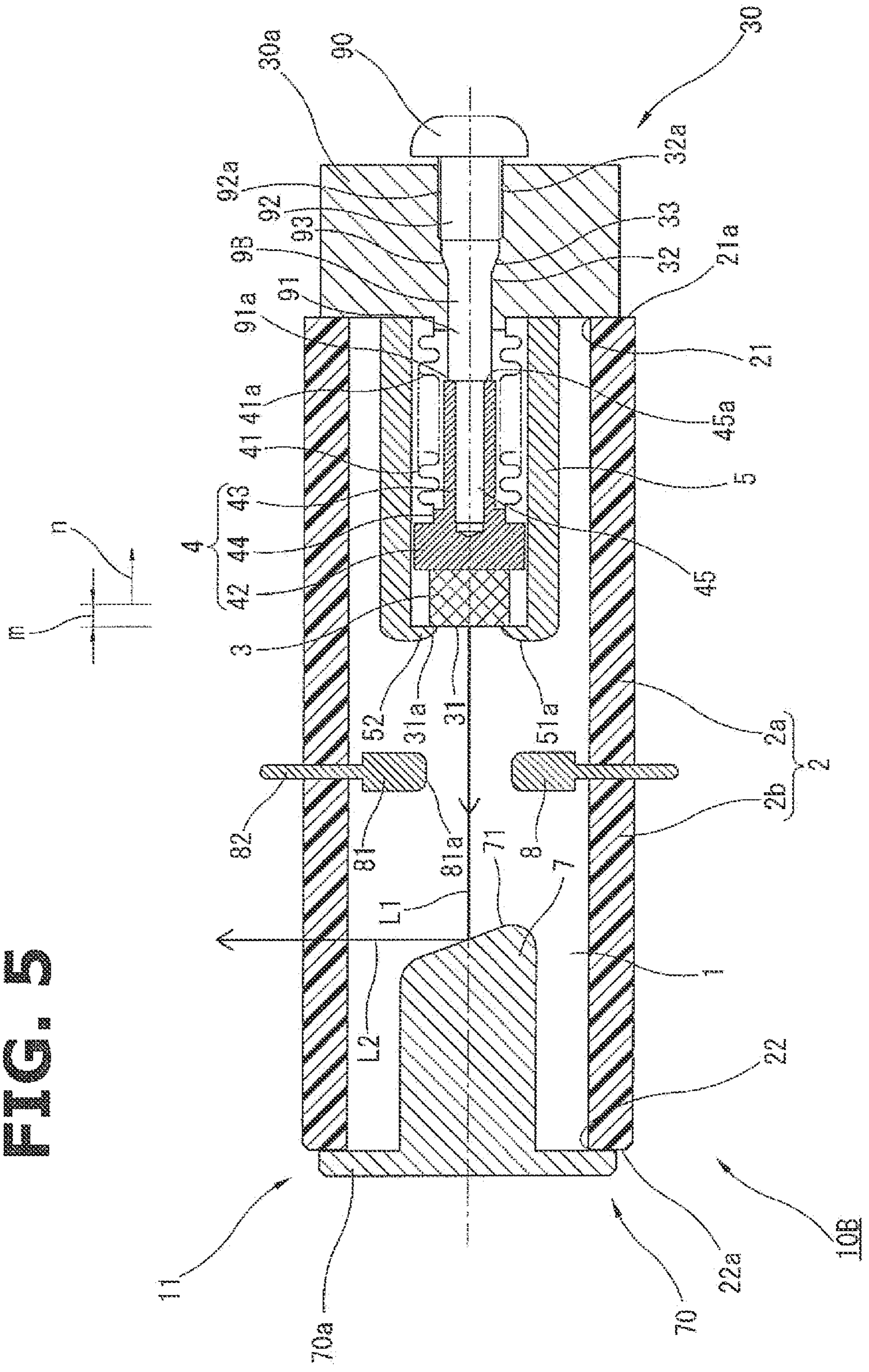
FIG. 5 is a schematic diagram illustrating an X-ray apparatus 10B according to an embodiment 3 (a sectional view vertically cut in both end directions of a vacuum chamber 1 (in a case where a pressing shaft 9B is applied)).
Figure 6:
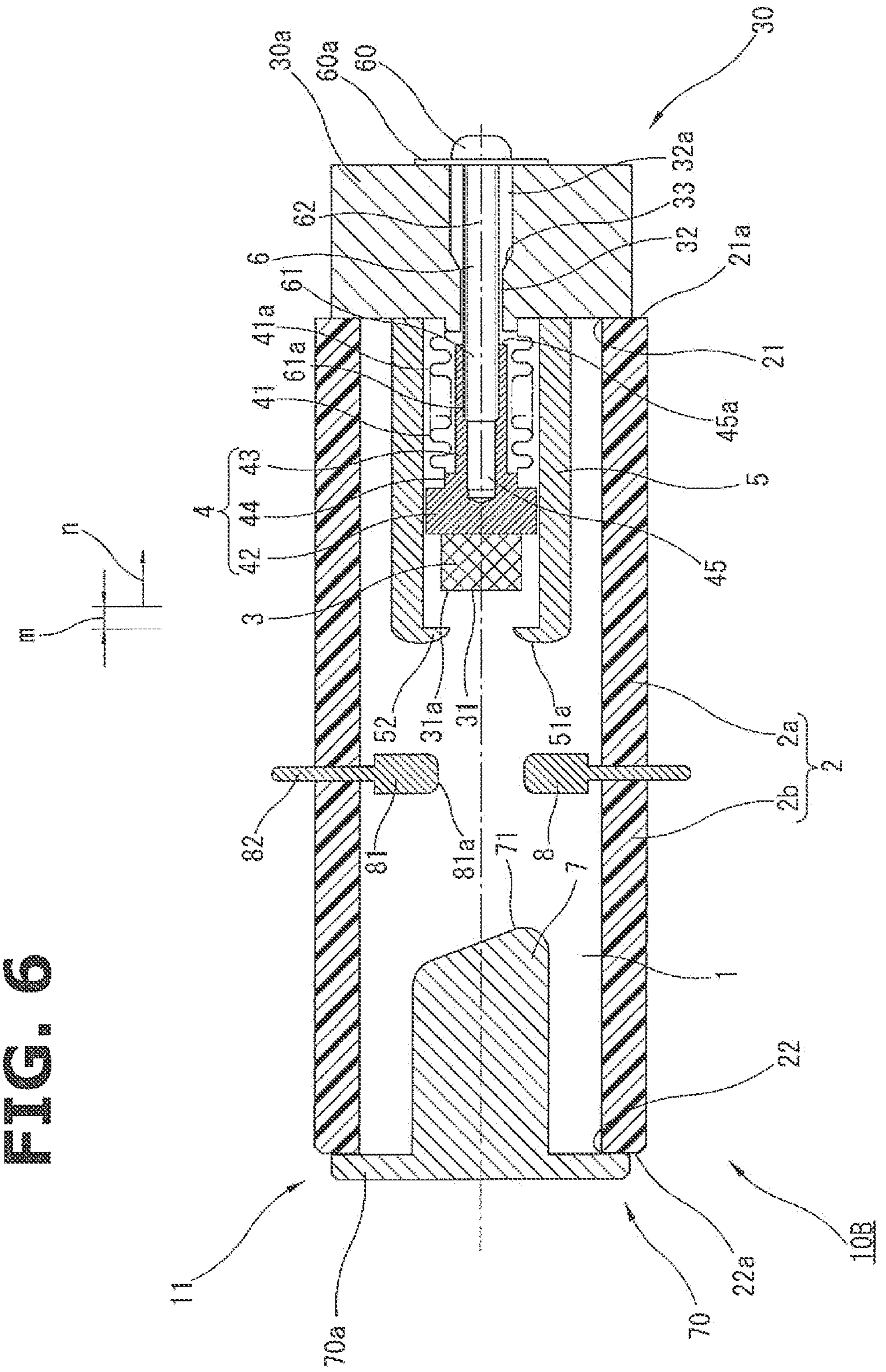
FIG. 6 is a schematic diagram illustrating the X-ray apparatus 10B according to the embodiment 3 (a sectional view vertically cut in both end directions of the vacuum chamber 1 (in a case where a position adjustment shaft 6 is applied)).

A reference sign 10B in schematic diagrams illustrated in FIGS. 5 and 6 is the X-ray apparatus according to an embodiment 3. The X-ray apparatus 10B is configured so that the pressing shaft 9B can be inserted into the emitter supporting unit operation hole 32.

The emitter supporting unit operation hole 32 of the X-ray apparatus 10B is provided, on an inner circumferential surface at the middle in the both end directions of the emitter supporting unit operation hole 32, with an inner circumferential step portion 33 whose diameter is reduced stepwise from the both-end one side toward the both-end other side. With this, a diameter of the inner circumferential surface of the emitter supporting unit operation hole 32 at the both-end one side with respect to the inner circumferential step portion 33 is larger than that at the both-end other side with respect to the inner circumferential step portion 33.

The pressing shaft 9B is provided, on an outer circumferential surface at the middle in the both end directions of the pressing shaft 9B, with an outer circumferential step portion 93 whose diameter is reduced stepwise from the both-end one side toward the both-end other side. With this, a diameter of the outer circumferential surface of the pressing shaft 9B at the both-end one side with respect to the outer circumferential step portion 93 is larger than that at the both-end other side with respect to the outer circumferential step portion 93. Regarding this pressing shaft 9B, in the same manner as the embodiment 2, the recess 91*b* (not shown) could be provided on the tip surface 91*a* of the pressing shaft 9B.

The inner circumferential step portion 33 and the outer circumferential step portion 93 are structured so that both of the inner circumferential step portion 33 and the outer circumferential step portion 93 overlap each other in the both end directions, and when both these portions 33 and 93 come into contact with each other (e.g. the both are in surface contact with each other), the electron generating portion 31 of the emitter 3 and the guard electrode 5 are in the predetermined adjacent state.

According to the embodiment 3 described above, the same working and effect as those of the embodiments 1 and 2 can be obtained, and also the following can be said. That is, when moving the pressing shaft 9B inserted in the emitter supporting unit operation hole 32 until both of the inner circumferential step portion 33 and the outer circumferential step portion 93 come into contact with each other, the movement toward the both-end other side of the pressing shaft 9B is limited as shown in FIG. 5, then it can be considered that the electron generating portion 31 of the emitter 3 and the guard electrode 5 are in the predetermined adjacent state.

Therefore, according to the embodiment 3, it is possible to easily check the predetermined adjacent state, and easily and properly set the movement amount in the both end directions of the pressing shaft 9B.

Here, as the inner circumferential step portion 33 and the outer circumferential step portion 93, various shapes or forms can be employed as long as when the electron generating portion 31 of the emitter 3 and the guard electrode 5 are in the predetermined adjacent state, these portions 33 and 93 come into contact with each other. As an example, the inner circumferential step portion 33 and the outer circumferential step portion 93 each have a shape that extends in the crossing direction (in the cross-section direction) on their contact surfaces. More specifically, like contact surfaces of the inner circumferential step portion 33 and the outer circumferential step portion 93 as shown in FIGS. 5 and 6, a tapered shape whose diameter is reduced in a radial direction of the emitter supporting unit operation hole 32 from the both-end one side toward the both-end other side is raised.

Embodiment 4

In an embodiment 4, as described below, an X-ray apparatus 10C to which a pressing shaft 9C can be applied is configured, then the movement amount in the both end directions of the pressing shaft 9C can be properly set.

<Schematic Configuration of X-Ray Apparatus 10C>

Figures 7A, 7B:
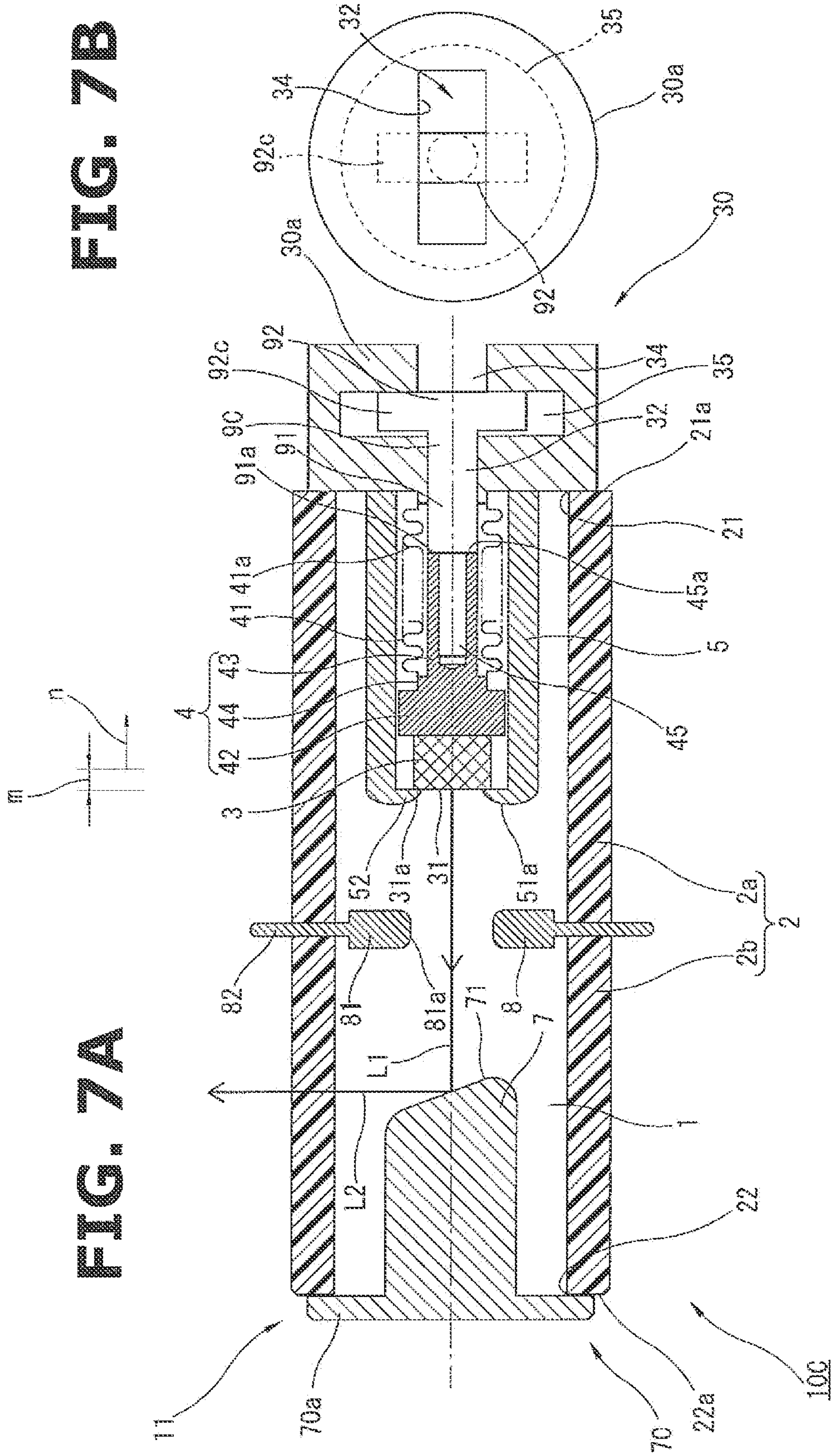
FIG. 7A is a schematic diagram illustrating an X-ray apparatus 10C according to an embodiment 4 (a sectional view vertically cut in both end directions of a vacuum chamber 1 (in a case where a pressing shaft 9C is applied)).
FIG. 7B is a diagram when viewing a flange portion 30*a* from a right side of FIG. 7A.
Figure 8:
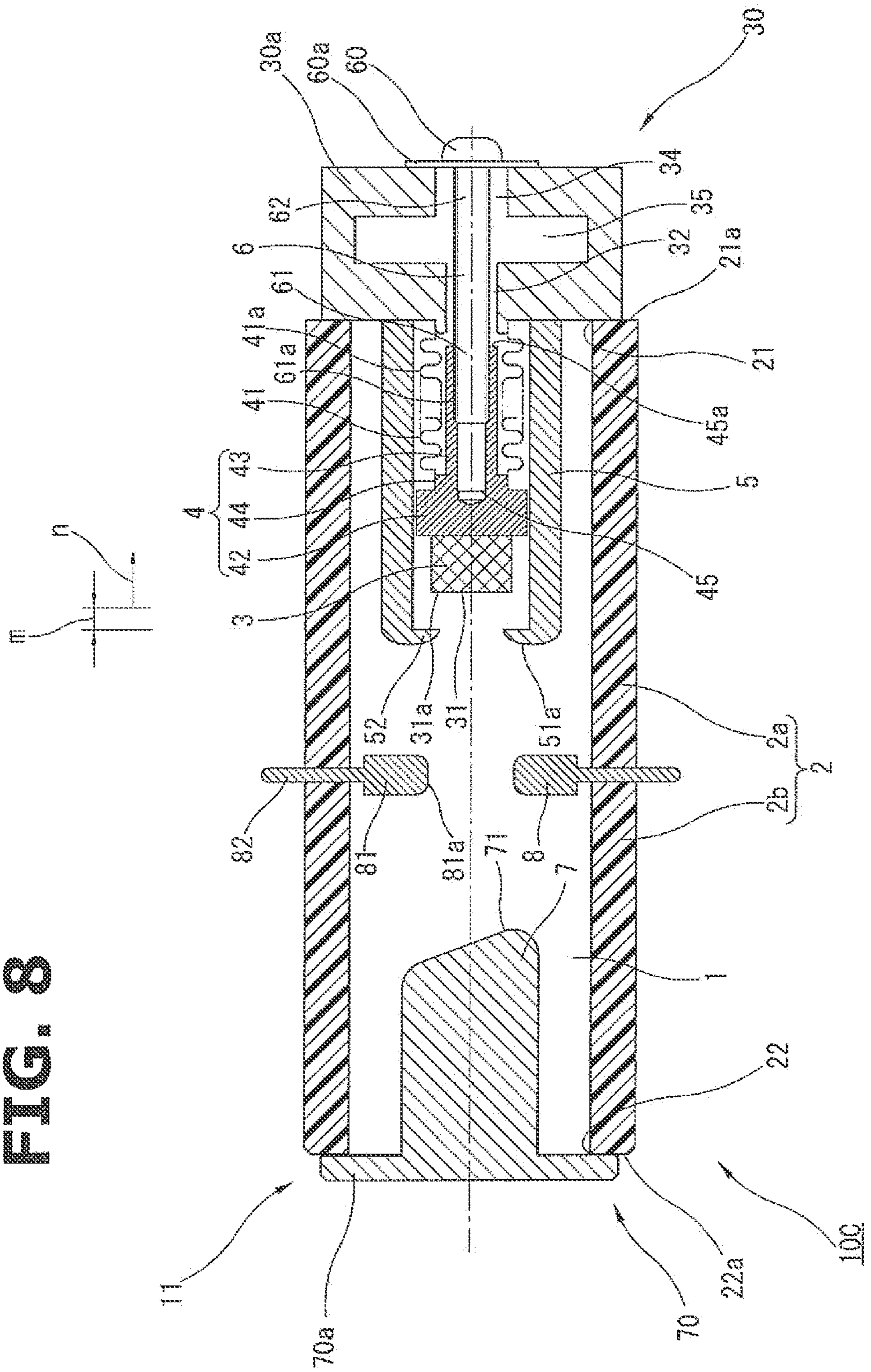
FIG. 8 is a schematic diagram illustrating the X-ray apparatus 10C according to the embodiment 4 (a sectional view vertically cut in both end directions of the vacuum chamber 1 (in a case where a position adjustment shaft 6 is applied)).

A reference sign 10C in schematic diagrams illustrated in FIGS. 7 and 8 is the X-ray apparatus according to an embodiment 4. The X-ray apparatus 10C is configured so that the pressing shaft 9C can be inserted into the emitter supporting unit operation hole 32.

The emitter supporting unit operation hole 32 of the X-ray apparatus 10C is provided with a base end portion passage 34 that extends from the both-end one side toward a middle side.

The base end portion 92 of the pressing shaft 9C has a protruding portion 92*c* that extends in two opposing directions of a radial direction of the pressing shaft 9C. This protruding portion 92*c* is shaped so that a radial dimension in a protruding direction of the protruding portion 92*c* is larger than a diameter at the both-end other side of the emitter supporting unit operation hole 32. Regarding this pressing shaft 9C, in the same manner as the embodiment 2, the recess 91*b* (not shown) could be provided on the tip surface 91*a* of the pressing shaft 9C.

The base end portion passage 34 has a long hole shape that expands in two opposing directions of a radial direction of the emitter supporting unit operation hole 32. This base end portion passage 34 is shaped so that a radial dimension in an expanding direction of the base end portion passage 34 is larger than the diameter at the both-end other side of the emitter supporting unit operation hole 32, and when the pressing shaft 9C inserted in the emitter supporting unit operation hole 32 is in a fixed attitude at an arbitrary angle in a turning direction, the base end portion 92 of the pressing shaft 9C is movable in the both end directions.

For instance, in the case of the base end portion passage 34 shown in FIG. 7B, when the pressing shaft 9C inserted in the emitter supporting unit operation hole 32 is in an attitude in which the protruding portion 92*c* of the pressing shaft 9C extends so as to protrude in right and left directions in the drawing, the base end portion 92 of the pressing shaft 9C is movable in the base end portion passage 34 in the both end directions.

Further, at a both-end other side of the base end portion passage 34, a hollow portion 35 that bulges outwards in the radial direction of the base end portion passage 34 is provided. This hollow portion 35 is shaped so that the base end portion 92, which is positioned at the both-end other side of the base end portion passage 34, of the pressing shaft 9C can be turned (can rotate), and as shown in FIGS. 7A and 7B, the protruding portion 92*c* of the pressing shaft 9C can be received (accommodated) in the hollow portion 35.

The pressing shaft 9C and the base end portion passage 34 are structured so that when the base end portion 92 of the pressing shaft 9C inserted in the emitter supporting unit operation hole 32 is positioned at the both-end other side of the base end portion passage 34 (when the base end portion 92 is placed in the hollow portion 35 and movement of the base end portion 92 toward the both-end other side is limited), the electron generating portion 31 of the emitter 3 and the guard electrode 5 are in the predetermined. Regarding this pressing shaft 9C, in the same manner as the embodiment 2, the recess 91*b* (not shown) could be provided on the tip surface 91*a* of the pressing shaft 9C.

According to the embodiment 4 described above, the same working and effect as those of the embodiments 1 to 3 can be obtained, and also the following can be said. That is, when moving the pressing shaft 9C inserted in the emitter supporting unit operation hole 32 until the base end portion 92 of the pressing shaft 9C is positioned at the both-end other side of the base end portion passage 34, the movement toward the both-end other side of the pressing shaft 9C is limited, then it can be considered that the electron generating portion 31 of the emitter 3 and the guard electrode 5 are in the predetermined adjacent state.

Therefore, according to the embodiment 4, it is possible to easily check the predetermined adjacent state, and easily and properly set the movement amount in the both end directions of the pressing shaft 9C. Further, the base end portion 92 of the pressing shaft 9C is received (accommodated) in the hollow portion 35, then the movement in the both end directions of the pressing shaft 9C is limited, thereby achieving positioning and fixing of the pressing shaft 9C.

In the case of the X-ray apparatus 10C shown in FIGS. 7A, 7B and 8, a screw-engaged configuration by the base end portion side male screw portion 92*a* and the operation hole female screw portion 32*a* is not used. Further, when performing the field emission, the base end portion 92 of the pressing shaft 9C can be accommodated in the X-ray apparatus 10C (in the flange portion 30*a*).

With this configuration, as compared with the X-ray apparatuses 10 to 10B employing the screw-engaged configuration, the X-ray apparatus 10C could be simplified and reduced in size. In addition, the movement in the both end directions of the pressing shaft 9C inserted in the emitter supporting unit operation hole 32 is facilitated, and when performing the field emission, a physical shock from an outer peripheral side of the X-ray apparatus 10C to the pressing shaft 9C can be suppressed (the pressing shaft 9C can be protected and damage to the pressing shaft 9C can be prevented).

Although the present invention has been described in detail only with respect to the embodiment described above, it is obvious to those skilled in the art that various modifications can be made within the scope of the technical idea of the present invention, and as a matter of course, such modifications belong to the scope of claims.

For instance, in the X-ray apparatuses 10, 10B and 10C, a guiding unit (e.g. a guide rail etc. (not shown) extending in the both end directions at an outer circumferential side of the emitter supporting unit 4) for moving and guiding the emitter supporting unit 4 in the both end directions may be provided as necessary.

In addition, modification in design appropriately using contents disclosed in Patent Document 1 etc. is also possible, and the same working and effect as those of the embodiments 1 to 4 can be obtained.

The invention claimed is:

1. An electric field radiation device comprising:

a vacuum enclosure having a vacuum chamber at an inner circumferential side of a tubular insulator whose both ends are sealed;

an emitter positioned at one side in both end directions in the vacuum chamber and having an electron generating portion that faces the other side in the both end directions of the vacuum chamber;

a guard electrode arranged at an outer circumferential side of the electron generating portion of the emitter;

a target positioned at the other side in the both end directions in the vacuum chamber and provided so as to face the electron generating portion of the emitter;

a movable emitter supporting unit supporting the emitter movably in both end directions of the vacuum chamber;

an emitter supporting unit female screw bore opening on the one side in the both end directions at the emitter supporting unit and having a screw bore that extends in the both end directions;

bellows having a tubular shape having a larger diameter than the emitter supporting unit female screw bore and expanding and contracting in the both end directions, wherein the bellows are arranged so that an axis of the tubular bellows extends coaxially with the screw bore of the emitter supporting unit female screw bore, one end side of the tubular bellows is retained by one side in the both end directions of the vacuum enclosure and the other end side of the tubular bellows is retained by an outer circumferential side of the emitter supporting unit, and form a part of the vacuum chamber;

an emitter supporting unit operation hole penetrating an inner circumferential side of the bellows in the both end directions at the one side in the both end directions of the vacuum enclosure and extending in the both end directions so that an axis of the emitter supporting unit operation hole is arranged coaxially with the screw bore of the emitter supporting unit female screw bore, the emitter supporting unit operation hole having a diameter that is larger than an opening diameter of the emitter supporting unit female screw bore; and either one of a position adjustment shaft insertable into the emitter supporting unit operation hole and the emitter supporting unit female screw bore or a pressing shaft insertable into the emitter supporting unit operation hole, wherein an opening edge surface of the emitter supporting unit female screw bore extends along a radial direction of the emitter supporting unit female screw bore, the emitter supporting unit operation hole has a shape into which one selected from the position adjustment shaft and the pressing shaft is insertable from shaft tip sides of the position adjustment shaft and the pressing shaft, the position adjustment shaft is configured to be turned with the position adjustment shaft inserted in the emitter supporting unit operation hole, and is provided, on an outer circumferential surface of a tip of the position adjustment shaft, with a tip side male screw portion configured to be screwed into the emitter supporting unit female screw bore, and the pressing shaft has, at a tip thereof, a tip surface having a larger diameter than the opening diameter of the emitter supporting unit female screw bore and extending along a radial direction of the pressing shaft.

2. The electric field radiation device as claimed in claim 1, wherein the pressing shaft is provided, at a middle of the tip surface of the tip thereof, with a recess which is open to the other side in the both end directions and whose diameter is larger than the opening diameter of the emitter supporting unit female screw bore.

3. The electric field radiation device as claimed in claim 1, wherein the emitter supporting unit operation hole is provided, at one side in the both end directions thereof, with an operation hole female screw portion having a screw bore that extends in the both end directions, and the pressing shaft is provided, on an outer circumferential surface of a base end portion thereof, with a base end portion side male screw portion configured to be screwed into the operation hole female screw portion.

4. The electric field radiation device as claimed in claim 1, wherein the guard electrode is provided, at the other side in the both end directions thereof, with a small diameter portion which and from which the electron generating portion of the emitter contacts and separates by movement in the both end directions of the emitter supporting unit.

5. The electric field radiation device as claimed in claim 1, wherein the guard electrode is provided, at the other side in the both end directions thereof, with an edge portion that extends to a screw bore side of the emitter supporting unit female screw bore and overlaps a circumferential edge portion of the electron generating portion of the emitter in the both end directions.

6. A field emission method using the electric field radiation device as claimed in claim 1, comprising:

setting an output of a field emission current by inserting a shaft selected from the position adjustment shaft and the pressing shaft into the emitter supporting unit operation hole from its shaft tip side and by changing a distance between the electron generating portion of the emitter and the target through the shaft and fixing and setting a position of the emitter at an arbitrary distance; and performing field emission from the electron generating portion of the emitter with the position of the emitter fixed.

7. A positioning and fixing method of the emitter of the electric field radiation device as claimed in claim 1, comprising:

inserting the position adjustment shaft into the emitter supporting unit operation hole from its shaft tip side;

bringing the electron generating portion of the emitter and the target into a separate state by screwing the position adjustment shaft into the emitter supporting unit female screw bore and turning the position adjustment shaft in a tightening direction;

performing a regeneration process to at least the guard electrode in the vacuum chamber by applying voltage across the guard electrode in the separate state;

after the regeneration process, removing the position adjustment shaft from the emitter supporting unit operation hole by turning the position adjustment shaft in a loosening direction, and inserting the pressing shaft into the emitter supporting unit operation hole from its shaft tip side; and bringing the electron generating portion of the emitter and the target closer to each other or into contact with each other, and positioning and fixing the emitter.

8. An electric field radiation device comprising:

a vacuum enclosure having a vacuum chamber at an inner circumferential side of a tubular insulator whose both ends are sealed;

an emitter positioned at one side in both end directions in the vacuum chamber and having an electron generating portion that faces the other side in the both end directions of the vacuum chamber;

a guard electrode arranged at an outer circumferential side of the electron generating portion of the emitter;

a target positioned at the other side in the both end directions in the vacuum chamber and provided so as to face the electron generating portion of the emitter;

a movable emitter supporting unit supporting the emitter movably in both end directions of the vacuum chamber;

an emitter supporting unit female screw bore having an opening on the one side in the both end directions at the emitter supporting unit and extending in the both end directions;

bellows having a tubular shape having a larger diameter than the emitter supporting unit female screw bore and expanding and contracting in the both end directions, wherein the bellows are arranged so that an axis of the tubular bellows extends coaxially with the screw bore of the emitter supporting unit female screw bore, one end side of the tubular bellows is retained by one side in the both end directions of the vacuum enclosure and the other end side of the tubular bellows is retained by an outer circumferential side of the emitter supporting unit, and form a part of the vacuum chamber;

an emitter supporting unit operation hole penetrating an inner circumferential side of the bellows in the both end directions at the one side in the both end directions of the vacuum enclosure and extending in the both end directions so that an axis of the emitter supporting unit operation hole is arranged coaxially with the screw bore of the emitter supporting unit female screw bore; and either one of a position adjustment shaft insertable into the emitter supporting unit operation hole and the emitter supporting unit female screw bore or a pressing shaft insertable into the emitter supporting unit operation hole, wherein an opening edge surface of the emitter supporting unit female screw bore extends along a radial direction of the emitter supporting unit female screw bore, the emitter supporting unit operation hole has a shape into which one selected from the position adjustment shaft and the pressing shaft is insertable from shaft tip sides of the position adjustment shaft and the pressing shaft, the position adjustment shaft is configured to be turned with the position adjustment shaft inserted in the emitter supporting unit operation hole, and is provided, on an outer circumferential surface of a tip of the position adjustment shaft, with a tip side male screw portion configured to be screwed into the emitter supporting unit female screw bore, the pressing shaft has, at a tip thereof, a tip surface having a larger diameter than an opening diameter of the emitter supporting unit female screw bore and extending along a radial direction of the pressing shaft, the emitter supporting unit operation hole is provided, on an inner circumferential surface at a middle in the both end directions thereof, with an inner circumferential step portion whose diameter is reduced stepwise from the one side toward the other side in the both end directions, the pressing shaft is provided, on an outer circumferential surface at a middle in the both end directions thereof, with an outer circumferential step portion whose diameter is reduced stepwise from the one side toward the other side in the both end directions, and both of the inner circumferential step portion and the outer circumferential step portion overlap each other in the both end directions, and come into contact with each other when the electron generating portion of the emitter and the guard electrode are brought closer to each other or into contact with each other.

9. The electric field radiation device as claimed in claim 8, wherein the inner circumferential step portion and the outer circumferential step portion each have a contact surface having a tapered shape whose diameter is reduced in a radial direction of the emitter supporting unit operation hole from the one side toward the other side in the both end directions.

10. An electric field radiation device comprising:

a vacuum enclosure having a vacuum chamber at an inner circumferential side of a tubular insulator whose both ends are sealed;

an emitter positioned at one side in both end directions in the vacuum chamber and having an electron generating portion that faces the other side in the both end directions of the vacuum chamber;

a guard electrode arranged at an outer circumferential side of the electron generating portion of the emitter;

a target positioned at the other side in the both end directions in the vacuum chamber and provided so as to face the electron generating portion of the emitter;

a movable emitter supporting unit supporting the emitter movably in both end directions of the vacuum chamber;

an emitter supporting unit female screw bore having an opening on the one side in the both end directions at the emitter supporting unit and extending in the both end directions;

bellows having a tubular shape having a larger diameter than the emitter supporting unit female screw bore and expanding and contracting in the both end directions, wherein the bellows are arranged so that an axis of the tubular bellows extends coaxially with the screw bore of the emitter supporting unit female screw bore, one end side of the tubular bellows is retained by one side in the both end directions of the vacuum enclosure and the other end side of the tubular bellows is retained by an outer circumferential side of the emitter supporting unit, and form a part of the vacuum chamber;

an emitter supporting unit operation hole penetrating an inner circumferential side of the bellows in the both end directions at the one side in the both end directions of the vacuum enclosure and extending in the both end directions so that an axis of the emitter supporting unit operation hole is arranged coaxially with the screw bore of the emitter supporting unit female screw bore, the emitter supporting unit operation hole comprising:

a base end portion passage that extends from the one side toward a middle side in the both end directions and expands in two opposing directions of a radial direction of the emitter supporting unit operation hole; and a hollow portion that bulges outwards in the radial direction of the emitter supporting unit operation hole at the other side in the both end directions of the base end portion passage, either one of a position adjustment shaft insertable into the emitter supporting unit operation hole and the emitter supporting unit female screw bore or a pressing shaft insertable into the emitter supporting unit operation hole, wherein an opening edge surface of the emitter supporting unit female screw bore extends along a radial direction of the emitter supporting unit female screw bore, the emitter supporting unit operation hole has a shape into which one selected from the position adjustment shaft and the pressing shaft is insertable from shaft tip sides of the position adjustment shaft and the pressing shaft, the position adjustment shaft is configured to be turned with the position adjustment shaft inserted in the emitter supporting unit operation hole, and is provided, on an outer circumferential surface of a tip of the position adjustment shaft, with a tip side male screw portion configured to be screwed into the emitter supporting unit female screw bore, the pressing shaft has, at a tip thereof, a tip surface having a larger diameter than an opening diameter of the emitter supporting unit female screw bore and extending along a radial direction of the pressing shaft, the pressing shaft has, at a base end portion thereof, a protruding portion that extends in two opposing directions of the radial direction of the pressing shaft, the base end portion passage is shaped so that a diameter thereof is larger than a diameter at the other side in the both end directions of the emitter supporting unit operation hole, and when the pressing shaft inserted in the emitter supporting unit operation hole is in a fixed attitude at an arbitrary angle in a turning direction, the base end portion of the pressing shaft is movable in the both end directions, and the hollow portion is shaped so that the base end portion, which is positioned at the other side in the both end directions of the base end portion passage, of the pressing shaft is configured to be turned.

11. The electric field radiation device as claimed in claim 10, wherein the pressing shaft and the base end portion passage are structured so that when the base end portion of the pressing shaft is positioned at the other side in the both end directions of the base end portion passage, the electron generating portion of the emitter and the guard electrode are brought closer to each other or into contact with each other.

* * * * *